US010521468B2

(12) United States Patent
Garg et al.

(10) Patent No.: US 10,521,468 B2
(45) Date of Patent: Dec. 31, 2019

(54) ANIMATED SEEK PREVIEW FOR PANORAMIC VIDEOS

(71) Applicant: Adobe Inc., San Jose, CA (US)

(72) Inventors: Tulika Garg, Ghaziabad (IN); Neeraj Goel, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 73 days.

(21) Appl. No.: 15/621,984

(22) Filed: Jun. 13, 2017

(65) Prior Publication Data

US 2018/0357245 A1 Dec. 13, 2018

(51) Int. Cl.
| | |
|---|---|
| *G06F 3/048* | (2013.01) |
| *G06F 16/44* | (2019.01) |
| *G11B 27/034* | (2006.01) |
| *G06F 16/783* | (2019.01) |
| *G06F 3/0481* | (2013.01) |
| *G06T 3/00* | (2006.01) |
| *G06T 15/04* | (2011.01) |

(52) U.S. Cl.
CPC .......... *G06F 16/444* (2019.01); *G06F 16/783* (2019.01); *G11B 27/034* (2013.01); *G06F 3/04815* (2013.01); *G06T 3/0037* (2013.01); *G06T 15/04* (2013.01); *G06T 2200/04* (2013.01); *G06T 2200/24* (2013.01); *G06T 2215/06* (2013.01)

(58) Field of Classification Search
CPC ........ H04L 51/32; H04L 65/601; H04L 67/22
See application file for complete search history.

(56) References Cited

U.S. PATENT DOCUMENTS

| | | | | |
|---|---|---|---|---|
| 8,817,067 | B1* | 8/2014 | Fan | H04N 5/23238 348/36 |
| 9,781,356 | B1* | 10/2017 | Banta | H04N 5/2628 |
| 9,883,101 | B1* | 1/2018 | Aloumanis | G02B 13/06 |
| 2004/0001146 | A1* | 1/2004 | Liu | G06K 9/00228 348/207.99 |
| 2004/0169724 | A1* | 9/2004 | Ekpar | G06T 3/0062 348/36 |
| 2004/0264919 | A1* | 12/2004 | Taylor | G11B 27/034 386/223 |
| 2009/0041378 | A1* | 2/2009 | Yamaoka | G06T 5/006 382/275 |

(Continued)

OTHER PUBLICATIONS

Lo, Shengxin, CN 201510844168.5; Control device and operating method thereof; published on 2016; 6 pages.*

(Continued)

*Primary Examiner* — Linh K Pham
(74) *Attorney, Agent, or Firm* — SBMC

(57) ABSTRACT

Generating animated seek previews for panoramic videos is described. In one or more implementations, a video frame associated with a seek point of a panoramic video is received. The video frame is reverse projected to generate a 3D projection. Portions of the 3D projection are then formed that are centered on and span an equatorial axis, and each portion is projected to a 2D plane to generate 2D projections of the portions. Animation frames are generated based on the projected portions, and the animation frames are compiled into an animation for consumption by a user as an animated seek preview of the video frame corresponding to the seek point.

20 Claims, 11 Drawing Sheets

(56) References Cited

U.S. PATENT DOCUMENTS

| | | | | |
|---|---|---|---|---|
| 2011/0173565 | A1* | 7/2011 | Ofek | G09B 29/00 |
| | | | | 715/790 |
| 2012/0162357 | A1* | 6/2012 | Okegawa | G06T 3/0025 |
| | | | | 348/36 |
| 2014/0063181 | A1* | 3/2014 | Lee | G06T 3/0025 |
| | | | | 348/36 |
| 2014/0181259 | A1* | 6/2014 | You | H04L 65/4069 |
| | | | | 709/219 |
| 2014/0300596 | A1* | 10/2014 | Liu | G06T 3/00 |
| | | | | 345/419 |
| 2015/0160038 | A1* | 6/2015 | Kirkpatrick | G06T 11/00 |
| | | | | 701/523 |
| 2016/0006979 | A1* | 1/2016 | Gilboa-Solomon | |
| | | | | G11B 27/005 |
| | | | | 386/248 |
| 2017/0054904 | A1* | 2/2017 | Li | H04N 5/23238 |
| 2017/0118475 | A1* | 4/2017 | Chang | H04N 19/56 |
| 2017/0206761 | A1* | 7/2017 | Li | G08B 13/19691 |
| 2017/0230577 | A1* | 8/2017 | Ishii | G06T 7/11 |
| 2017/0244959 | A1* | 8/2017 | Ranjeet | G08B 13/19641 |
| 2017/0287170 | A1* | 10/2017 | Perona | G06K 9/0063 |
| 2017/0347026 | A1* | 11/2017 | Hannuksela | G09G 5/14 |
| 2017/0354888 | A1* | 12/2017 | Benedetto | A63F 13/63 |
| 2018/0115706 | A1* | 4/2018 | Kang | H04N 5/23238 |
| 2018/0174619 | A1* | 6/2018 | Roy | G11B 27/102 |
| 2018/0192249 | A1* | 7/2018 | Lehtiniemi | H04W 4/029 |
| 2018/0267488 | A1* | 9/2018 | Lo | G05B 15/02 |

OTHER PUBLICATIONS

El-Ganainy et al., Spatiotemporal Rate Adaptive Tiled Scheme for 360 Sports Events; T El-Ganainy—2017, 9 pages.*

* cited by examiner

ANIMATED SEEK PREVIEW FOR PANORAMIC VIDEOS

BACKGROUND

While viewing digital videos, hereinafter referred to simply as videos, users often wish to preview various portions of the videos. For example, when viewing a five-minute video, a user may wish to determine content of the video at a four-minute mark. In order to preview content within videos, a computing device often presents a video progress bar which enables the users to provide inputs to the computing device to preview and navigate to seek points corresponding to time positions within the video. For example, the computing device may receive an input corresponding to a cursor hover over a specified seek point in the video progress bar and cause a display of a video frame corresponding to the seek point. In typical videos, a simple display of a video frame of the video associated with a seek point works well. However, basic video frame display for panoramic videos can be problematic due to the amount of content included within the video frame for display by the computing device.

Panoramic videos are typically output as 3D projections by the computing device due to fields of view that are generally larger than that of a human eye. 3D projections enable a user to "look around" and give a sense of actually being in the scene when rendered by the computing device. Typically, this is performed by the computing device through output of a viewport that contains a smaller field of view that can be manipulated in order to view other portions of the scene, e.g., look up, down, sideways, etc. Thus, at any given time, a user is generally able to view a limited portion of the panoramic video that is output by the computing device. Because of the large fields of view of panoramic videos, meaningful seek previews become difficult.

Conventional seek preview techniques fail to effectively convey an entire video frame when confronted with panoramic videos either due to attempting to display the entire frame as a static image or by merely displaying a limited portion of the frame. For example, in one conventional technique, a computing device displays an entire 2D projection of a frame of a panoramic video corresponding to the seek point. However, by doing so, the resultant preview contains distortions to objects that often result in an inability to discern individual objects within the projection. In another conventional technique, a computing device may display a portion of the frame at the seek point corresponding to a current viewport. Although the portion of the frame is visually pleasing and comprehendible to a user, many of the objects within the image may reside outside of the viewport. Accordingly, if the video involves an object that is outside of the viewport at the seek point, the user may miss key details of the video at the seek point and determine that the seek point has nothing of interest. Thus, conventional techniques fail to generate useful seek previews for panoramic videos such that a user can easily comprehend content within a frame of the panoramic videos corresponding to seek points.

SUMMARY

Animated seek preview for panoramic videos is described that is based, at least in part, on generating animated previews of video frames of panoramic videos by a computing device corresponding to seek points. In this way, a user can quickly and easily see an animation of a video frame of a panoramic video that depicts the content of the video frame intuitively and overcomes the technical limitations of conventional video seek preview techniques when confronted with panoramic videos. In an implementation, a digital medium environment includes at least one computing device that is configured to receive a seek point of a panoramic video. The computing device then determines a video frame corresponding to the seek point and projects the video frame onto a 3D surface, such as a sphere. From there, the computing device generates a series of 2D projections of portions of the 3D projection centered around an equatorial axis. Finally, the computing device compiles the 2D projections of the portions into an animation and outputs the animation of the video frame corresponding to the seek point.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
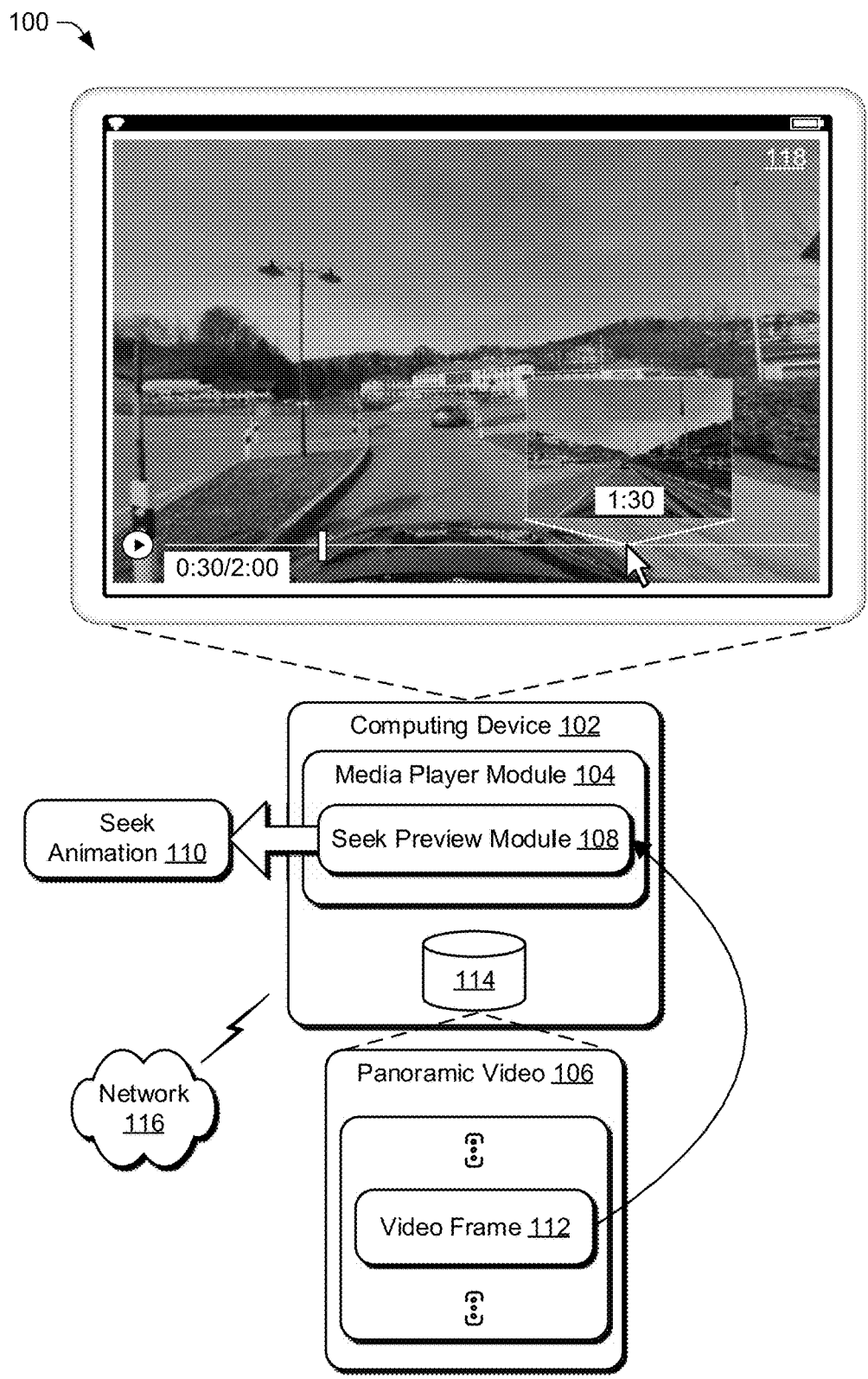
FIG. 1 is an illustration of a digital medium environment in an example implementation that is operable to generate animated seek previews for panoramic videos.

Panoramic videos generally capture a scene with a field of view that is larger than that of a human eye. In most cases, panoramic videos are output as a 3D projection by a computing device. The computing device generally projects the panoramic video onto a 3D surface, for example, onto a sphere "around" the viewer and implements a manipulable viewport with a field of view much smaller and closer to that of a human eye. In order to provide a preview a video frame of a panoramic video, conventional techniques either output an entire 2D projection of the video frame by a computing device or output a portion of the video frame by the computing device corresponding to a currently displayed viewport. These conventional techniques, however, may result in a seek preview output by the computing device that is difficult to decipher and may lack portions of the panoramic video that are relevant to a user.

Techniques and systems are described to generate animated seek previews for panoramic videos. When seeking within videos, a user's experience is generally dictated by the accuracy and the speed at which content corresponding to seek points can be parsed. In the special case of a panoramic video, a user wants to view an entirety of a scene at a seek point in an intuitive manner, such that the user can quickly and easily determine if the seek point is relevant.

In one example, the computing device receives a video frame of a panoramic video, from which, the animation is to be generated. The video frame corresponds to a seek point in the panoramic video and may be configured in a variety of ways, such as a 2D projection, a 3D projection, a virtual reality format, a specialized file format for panoramic videos, and so on. Regardless, of how the video frame is received, the computing device projects the video frame onto a 3D surface to generate a 3D projection. From the 3D projection, the computing device generates a series of portions of the 3D projection and projects these portions to 2D planes to create animation frames. For example, the computing device may use a "sliding window" that progresses an equator of the 3D surface in order to generate this series. The computing device then compiles the series of animation frames into an animation of the video frame corresponding to the seek point and outputs the animation. In this way, an animation of a video frame of a panoramic video associated with a seek point may be displayed by the computing device responsive to a user request to preview the seek point. A variety of other examples are also contemplated as further described in the following sections.

An example environment is described that may employ the animation generation techniques described herein. Example procedures are then described which may be performed in the example environment as well as other environments. Consequently, performance of the example procedures is not limited to the example environment and the example environment is not limited to performance of the example procedures.

Terms

The term "panoramic video" refers to any electronic video file that captures image data showing a field of view greater than a human eye, approximately 160° by 75°. For example, many panoramic videos have fields of view of 360° by 180°, which are referred to as 360° videos, spherical view videos, globe view videos, and so on.

The term "field of view" refers to a range of view angles displayed as part of a projection, e.g. 160° by 75°.

The term "viewport" refers to a specific field of view corresponding to a portion of a panoramic video. For example, a "front" viewport may comprise a field of view of −80°, 80° by −34.5°, 34.5° when using standard latitude and longitude coordinates. Viewports are discussed with reference to FIG. 5.

The term "seek point" refers to a time point of a panoramic video. For example, a seek may refer to an elapsed time, a time remaining, a time of day, a chapter, and so on.

The term "video frame" refers to video data corresponding to a seek point in a video.

The term "seek preview" refers to a representation of a video frame at a seek point that is overlain on top of a current video frame.

The term "2D projection" or "forward projection" refers to any sort projection of a video frame of a panoramic video or a portion of a video frame of a panoramic video onto a 2D plane such as a cylindrical projection, equirectangular projection, fisheye projection, cubic projection, and so on. 2D projections are typically used to store panoramic videos.

The term "equirectangular projection" refers to a direct projection or non-projection where longitudinal coordinates map directly to horizontal coordinates and latitudinal coordinates map directly to vertical coordinates between 3D and 2D, respectively.

The term "3D projection" or "reverse projection" refers to any sort of projection of a video frame of a panoramic video or a portion of a video frame of a panoramic video onto a 3D surface such as a sphere.

The term "animation frame" refers to a single viewport generated from either a portion of the video frame directly (if it is an equirectangular projection) or from a 2D projected portion of a 3D projection of the video frame centered on an equatorial axis of a video frame.

The term "seek animation" refers to a series of animation frames for a video frame that are combined in an order of proximity to each other. When combined, the animation depicts a circumnavigation of an equatorial axis of a video frame. Examples of animations are animated gifs, movies, slideshows, and so on.

Example Environment

FIG. 1 depicts a digital medium environment, generally at 100, in an example implementation that is operable to generate animated seek previews for panoramic videos. Digital medium environment 100 includes a computing device 102 that generates a seek animation of a video frame associated with a received seek point of a panoramic video. The seek animation is output as a seek preview in a user interface such that a user that interacts with the seek preview is able to quickly and easily comprehend contents of the entire video frame corresponding to the seek point.

In order to do so, computing device 102 contains a media player module 104 that is implemented at least partially in hardware of computing device 102 to display panoramic video 106 along with one or more video controls, e.g. stop, play, progress bar, and so on. Media player module 104 contains a seek preview module 108 that is implemented at least partially in hardware to generate seek animation 110 from video frame 112 corresponding to a seek point of panoramic video 106. Seek animation 110, for instance, may be configured to depict a series of portions of video frame 112 that corresponds to a seek point in a progress bar. Both panoramic video 106 and video frame 112 are illustrated as stored in a storage device 114, however, in one implementation, media player module 104, seek preview module 108, panoramic video 106, video frame 112, or any combination thereof may be implemented in whole or in part "in the cloud" via network 116, e.g., the Internet, a Wi-Fi network (e.g., in accordance with one or more IEEE 802.11 standards), a wireless network, cellular data network, and so forth. For example, user interface view 118 may display a current frame of panoramic video 106 concurrently with a seek preview of video frame 112. Generally, video frame 112 is not the current frame, however, video frame 112 may be the current frame without departing from the techniques described in the following description. Details of seek preview module 108 and how it is implemented to generate seek animation 110 of video frame 112 that is associated with a seek point of panoramic video 106 is described with regards to FIG. 2.

Figure 2:
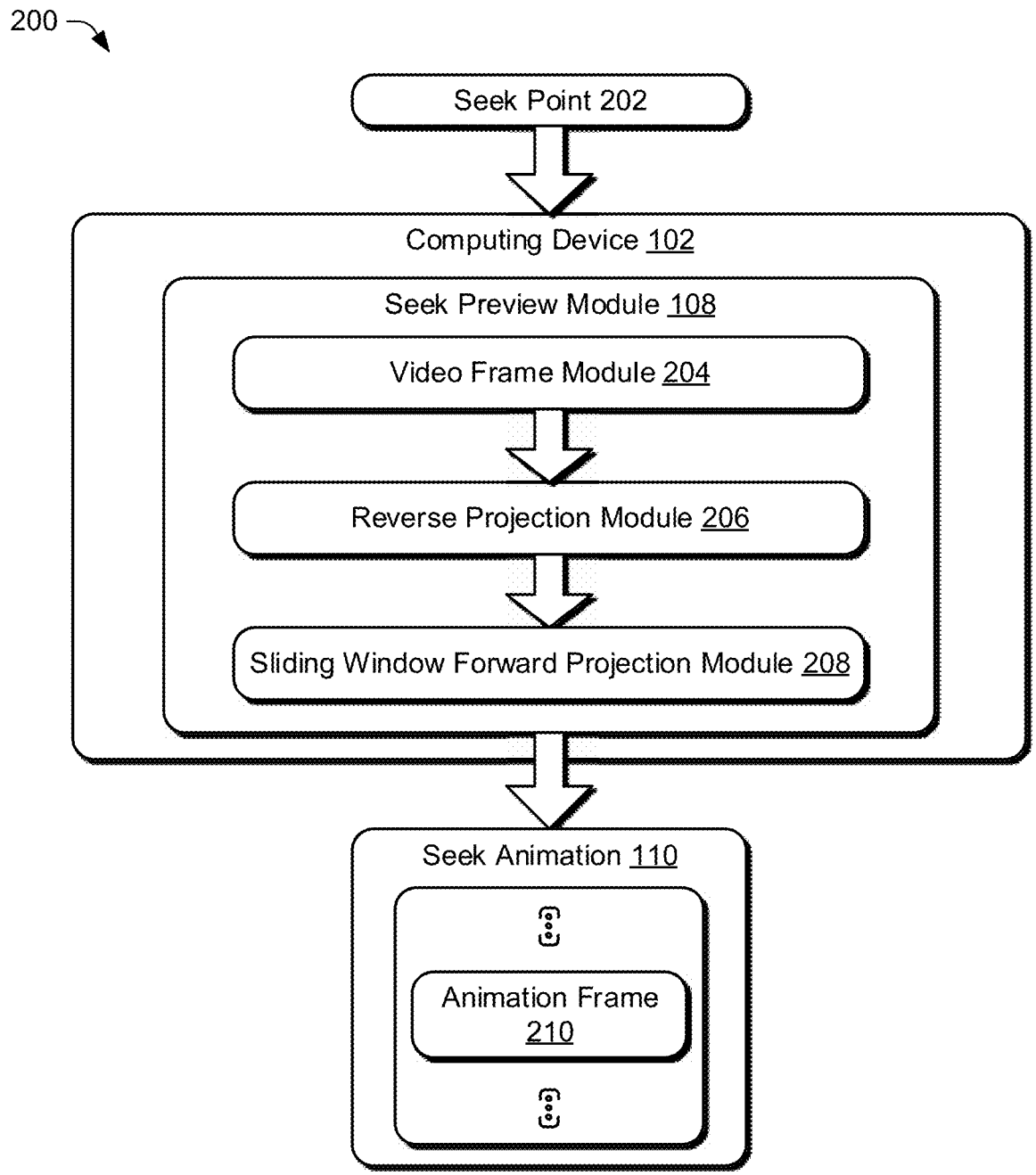
FIG. 2 is an illustration of an example digital medium implementation illustrating the seek preview module of FIG. 1 in greater detail.

FIG. 2 depicts an example implementation, generally at 200, showing operation of seek preview module 108 of FIG. 1 in greater detail as generating seek animation 110 of video frame 112 corresponding to a seek point 202 of panoramic video 106. In order to do so, seek point 202 is first received by a video frame module 204 that is implemented at least partially in hardware to obtain video frame 112 corresponding to seek point 202. Seek point 202 may correspond to a received user input to a progress bar, a received user input specifying a time in the video, a received function via a cursor control device (e.g., mouse), a received gesture and so on. Once seek point 202 is received, the video frame module obtains video frame 112 corresponding to seek point 202 from frames of panoramic video 106. Video frame 112 may be received by video frame module 204 in any number of formats, such as raw data, a 3D projection, a 2D projection, a panoramic viewer file type, and so on. Furthermore, video frame module 204 may receive video frame 112 from local computing device 102, e.g. from storage 114, or from another computing device connected to computing device 102 through network 116, e.g., the Internet, a Wi-Fi network (e.g., in accordance with one or more IEEE 802.11 standards), a wireless network, cellular data network, via upload or email, and so forth.

Next, computing device 102 utilizes a reverse projection module 206 that is implemented at least partially in hardware to project video frame 112 onto a 3D surface, such as a sphere, in order to generate a 3D projection of video frame 112. For example, when video frame 112 is projected onto a sphere, a viewer of the projection may be imagined as positioned at the center of the sphere with the scene projected on all sides of the sphere. If video frame 112 is natively a suitable 3D projection, then the projection is not generated.

The 3D projection of video frame 112 is then received by a sliding window forward projection module 208 that is implemented at least partially in hardware to generate 2D projections of portions of the 3D projection of video frame 112. Sliding window forward projection module 208 utilizes a window (e.g., centered) on an equator of the 3D projection that is "slid" over the surface of the 3D projection, and the 2D projections are generated for each new portion that is encompassed by the window. The process is continued until the window circumnavigates the 3D projection. The 2D projections are then used to form animation frames 210 of a seek animation 110. In an instance in which video frame 112 is an equirectangular 2D projection, seek preview module 108 generates animation frames directly from portions of video frame 112 centered on the equatorial axis without reverse and forward projection.

Figure 3:
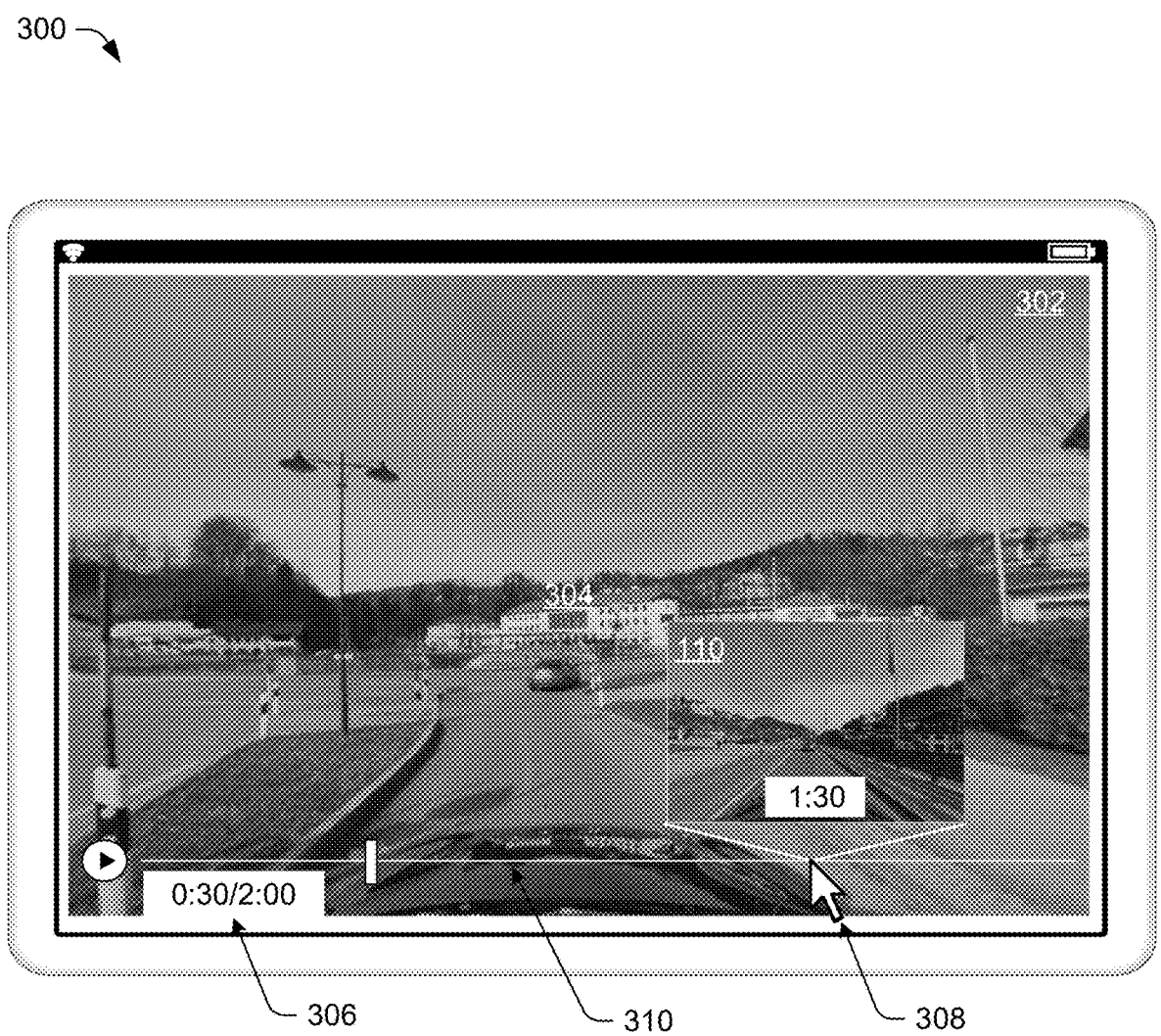
FIG. 3 is an illustration of an example user interface in accordance with one or more implementations.

FIG. 3 depicts an example implementation, generally at 300, showing an example user interface 302 as implementing seek preview module 108 of FIG. 1. User interface 302 displays a current video frame with a current viewport 304 associated with a current time 306. User interface 302 also displays a cursor 308. Cursor 308, for instance, may be placed anywhere on progress bar 310 via a user input to user interface 302 in order to cause computing device 102 to generate seek animation 110 of video frame 112 corresponding to seek point 202. In this case, cursor is at seek point 1:30, thus, seek animation 110 corresponds to video frame 112 at time point 1:30 in the panoramic video.

Figure 4:
FIG. 4 is an illustration of an example implementation illustrating an example 2D projection of a frame of a panoramic video.
Figure 4:
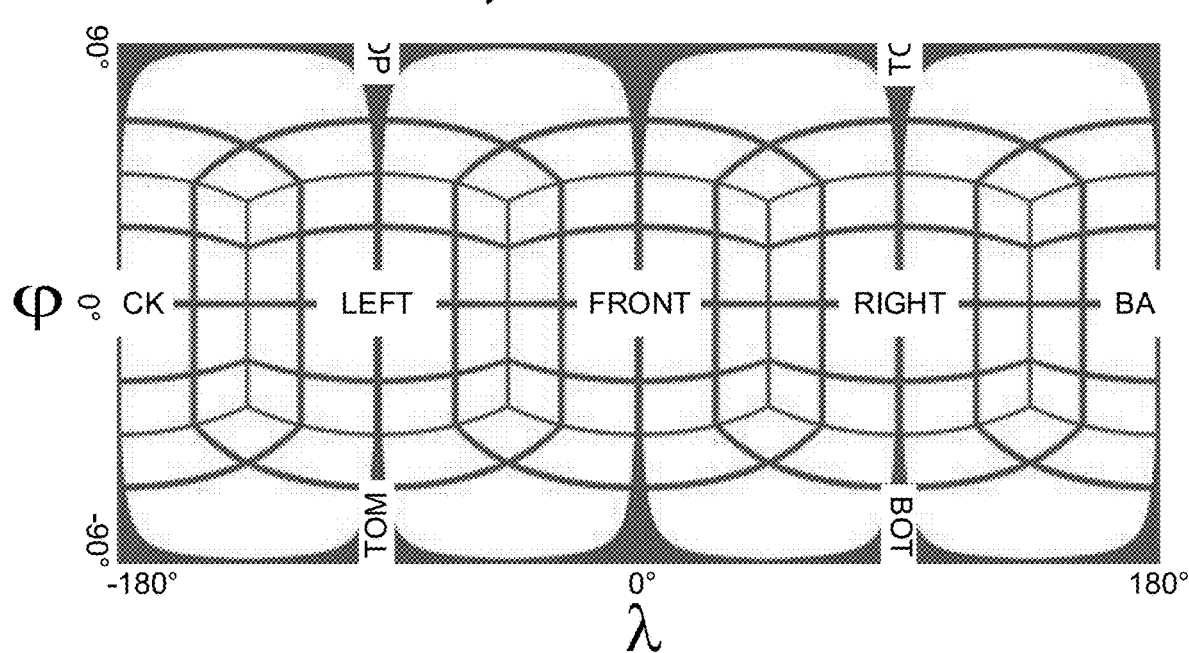

FIG. 4 depicts an example implementation, generally at 400, showing a video frame as a 2D equirectangular projection 402 of the current video frame without a viewport and an example coordinate system 404 for the 2D equirectangular projection. In this example, coordinate system uses standard latitude (phi) and longitude (lambda) coordinates that are similar to coordinates used for globes and maps of Earth. Coordinate system 404 also contains general designations of directions, e.g. front, sides, and back, that are commonly used to describe portions of a panoramic video. When used along with 2D equirectangular projection 402, the roundabout is in front of the viewer, the concrete sidewalk and other side of the street are to the left and right of the viewer, and the road and sun are behind the viewer. Any coordinate system or directional designations may be used without departing from the techniques described in the following description.

Figure 5:
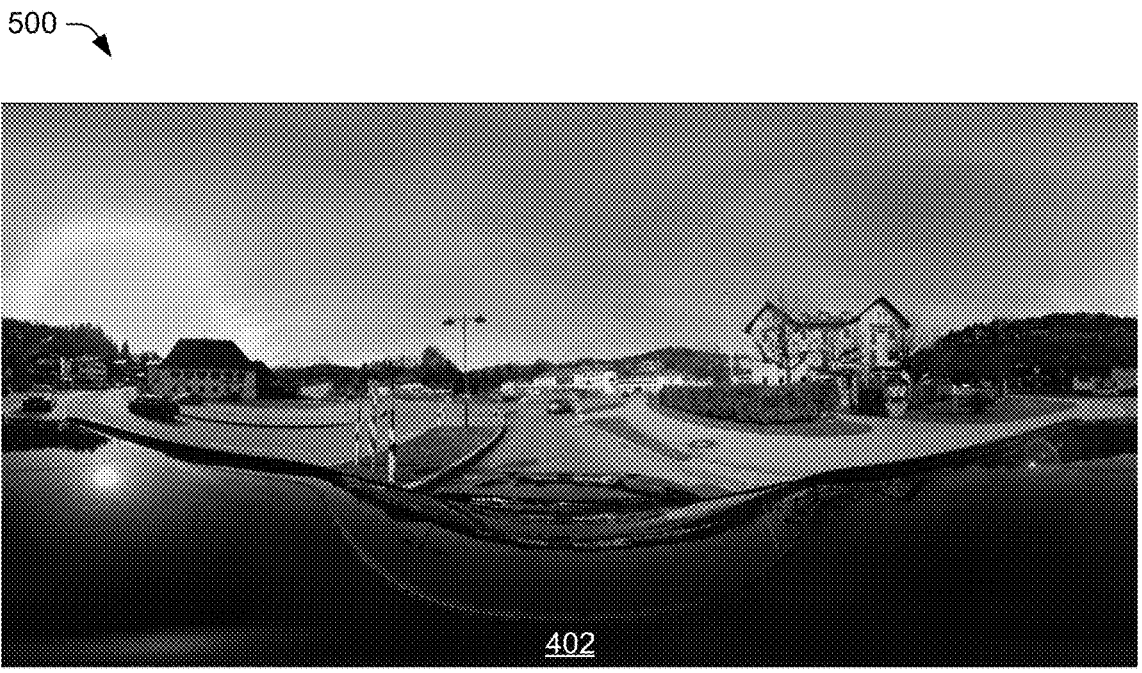
FIG. 5 is an illustration of an example implementation illustrating various viewports that can be utilized to view the video frame of FIG. 4.
Figure 5:
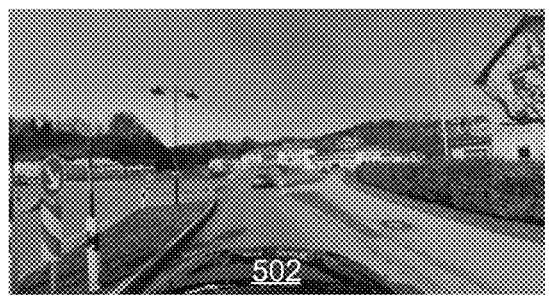
Figure 5:
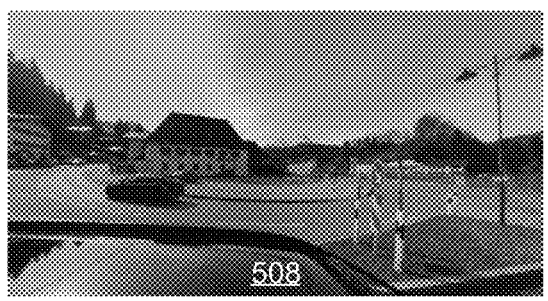
Figure 5:
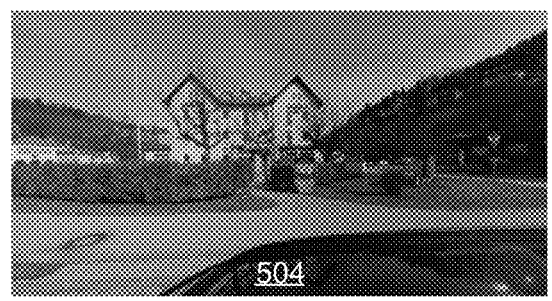
Figure 5:
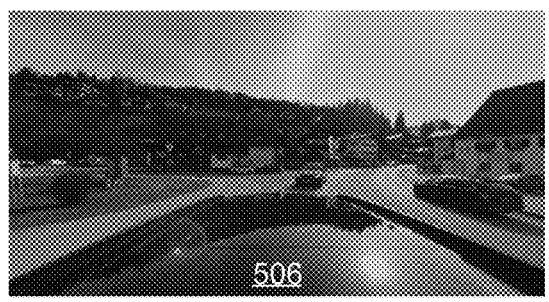

FIG. 5 depicts an example implementation, generally at 500, showing examples of viewports that may be used to view panoramic video 106. Using the 2D projection of current video frame 402 from FIG. 4 as an example, four viewports are depicted. There is a front viewport 502, a driver's right viewport 504, a rear viewport 506, and a driver's left viewport 508. Using coordinate system 404, the front viewport 502 may span −80°, 80° by −34.5°, 34.5°, the driver's right viewport 504 may span 10°, 170° by −34.5°, 34.5°, the rear viewport 506 may span 100°, −100° by −34.5°, 34.5°, and the driver's left viewport 508 may have coordinates of −170°, −10° by −34.5°, 34.5°. These viewports are merely examples and any number of viewports containing any fields of view may be used without departing from the techniques described in the following description.

Figure 6:
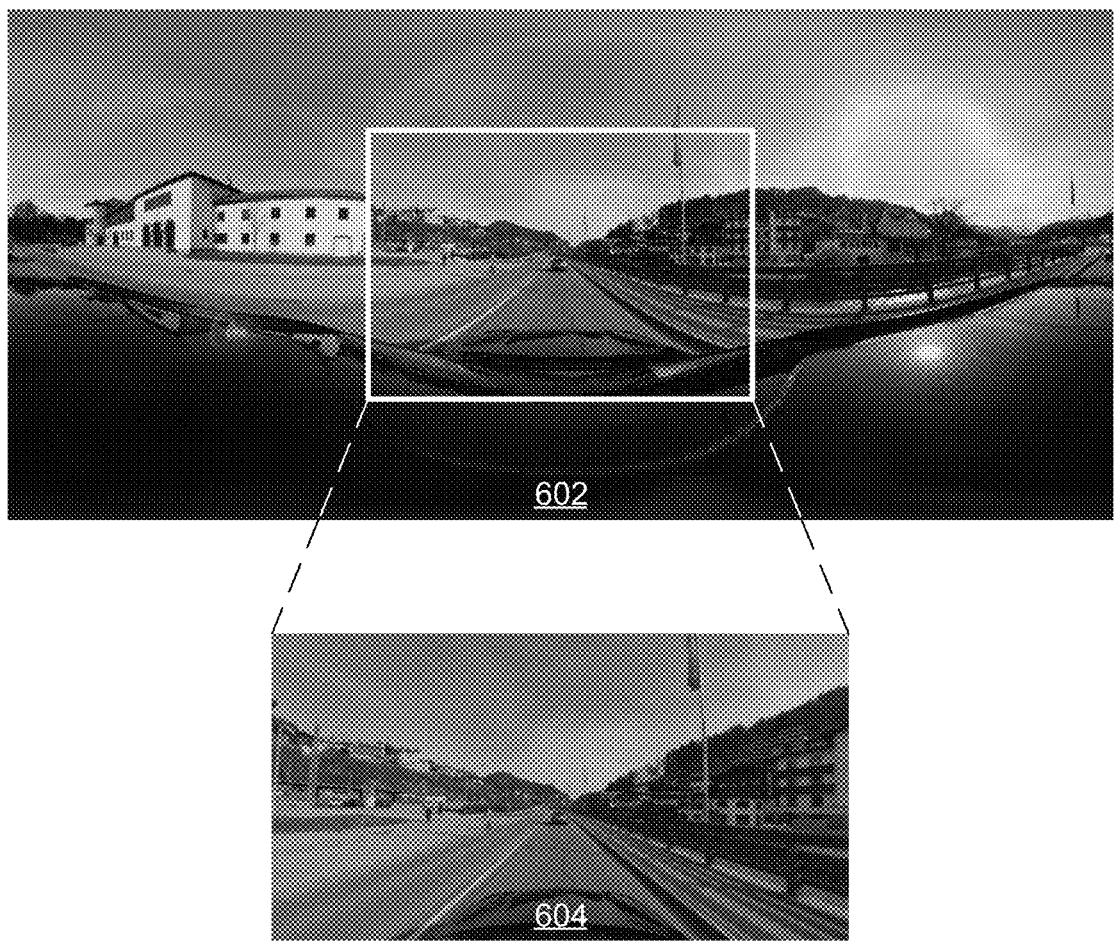
FIG. 6 is an illustration of an example implementation illustrating conventional techniques of generating a seek preview for the video frame associated with the seek point of FIG. 3.

FIG. 6 depicts examples of conventional techniques of generating a seek preview for video frame 112 corresponding to seek point 202. In this example, a first static preview 602 may be generated comprising an entirety of the 2D projection of video frame 112. As shown, a user may not be able to discern details about objects within the preview due to distortion and the large field of view within the preview. A second static preview 604 may be generated comprising a portion of video frame 112 corresponding to a current viewport, which in this example is the front viewport 508 (same as the viewport in 304). By only displaying a small portion (single viewport) of video frame 112 as a preview, a user may miss important details that are contained in the other portions of video frame 112. For example, if the user were to be viewing the video from the driver's left viewport and was looking for a flagpole, any seek preview using the driver's left viewport would not capture the flagpoles shown on the right side of the road.

Figure 7:
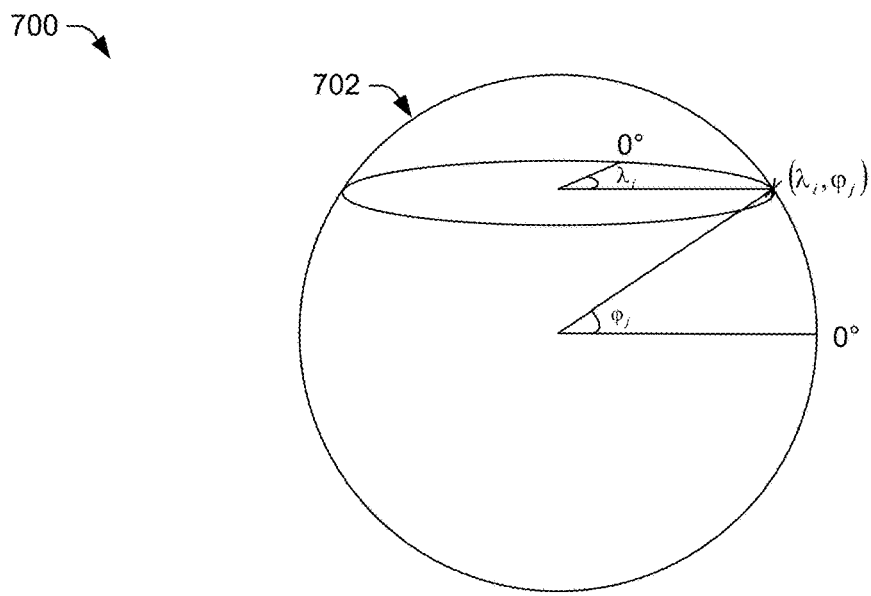
FIG. 7 is an illustration of an example implementation illustrating a relationship between a 2D projection and a 3D projection of a panoramic image.

FIG. 7 depicts an example implementation, generally at 700, showing coordinates of a "reverse projected" video frame to a 3D spherical projection 702 by reverse projection module 206. The term reverse is used because, as discussed above, the native format of a panoramic video is a 3D projection. Since video frame 112 is stored as a 2D projection, the points are able to be mapped to the 3D projection having coordinates $(\lambda_i, \varphi_j)$ corresponding to their longitude and latitude, respectively.

Figure 8:
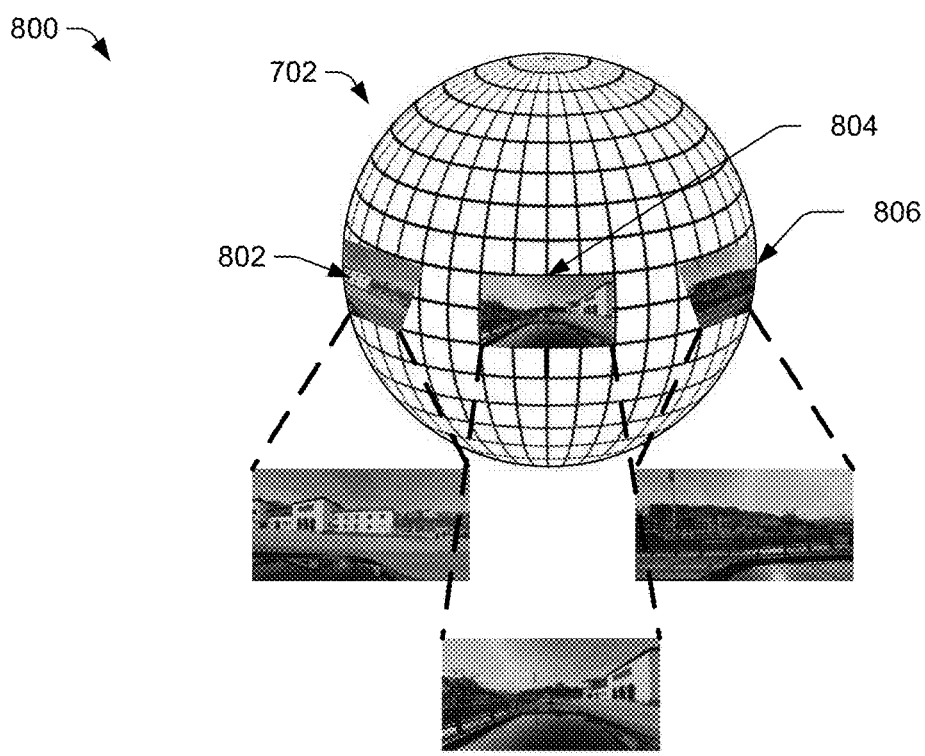
FIG. 8 is an illustration of an example implementation illustrating multiple 2D projections of portions of a 3D projection of the video frame associated with the seek point of FIG. 3.

FIG. 8 depicts an example implementation, generally at 800, showing how portions of 3D spherical projection 702 from FIG. 7 are forward projected back to 2D by sliding window forward projection module 208 to generate respective animation frames. In order to do so, a series of portions 802-806 of the 3D projection are generated along the equator of the spherical projection by sliding window forward projection module 208.

Figure 9:
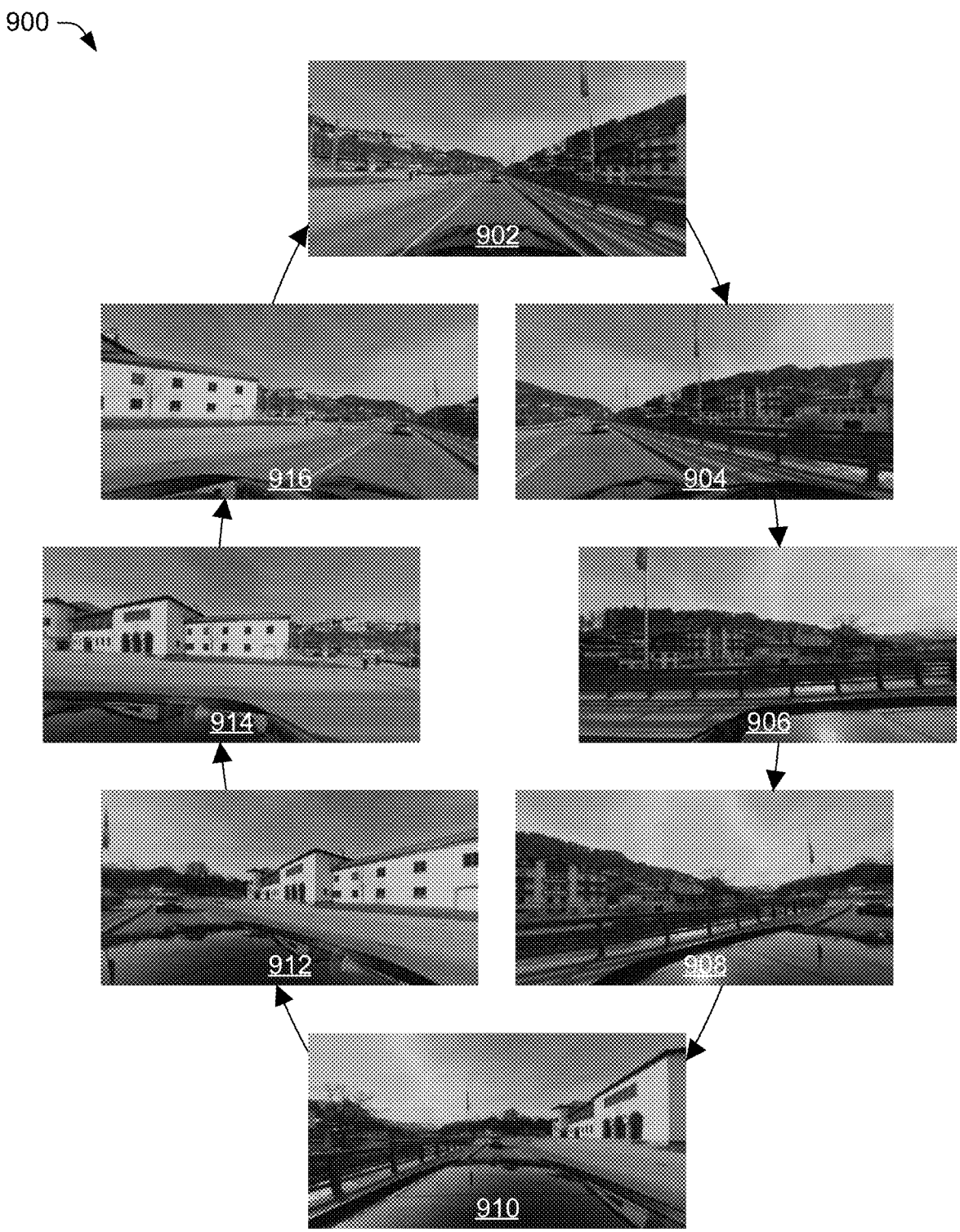
FIG. 9 is an illustration of an example implantation illustrating example animation frames for the video frame associated with the seek point of FIG. 3.

FIG. 9 depicts an example implementation, generally at 900, showing a series of animation frames 902-916 as a result of seek preview module 208 traversing the equator of video frame 112. Each of the animation frames in this example is offset by approximately 45° along the longitudinal axis. When combined in seek animation 110, animation frames 902-916 represent a revolving 360° view around the scene contained in video frame 112 corresponding to seek point 202. In this way, a user can intuitively grasp the contents of the panoramic video 106 at the seek point 202 through an animation of viewports of video frame 112 that traverse an equator of video frame 112.

Through use of the techniques described herein, an animation can be generated of a video frame of a panoramic image corresponding to a seek point. For example, if an input is received corresponding to a cursor hover over a seek point of 1:30, then the computing device will output an animated preview of viewports that revolve around an equatorial axis of a video frame at 1:30. In this way, a user can quickly and accurately assess content of the panoramic video at the specified seek point which leads to a better user experience.

Example Procedures

The following discussion describes generating animated seek previews for panoramic videos that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

Figure 10:
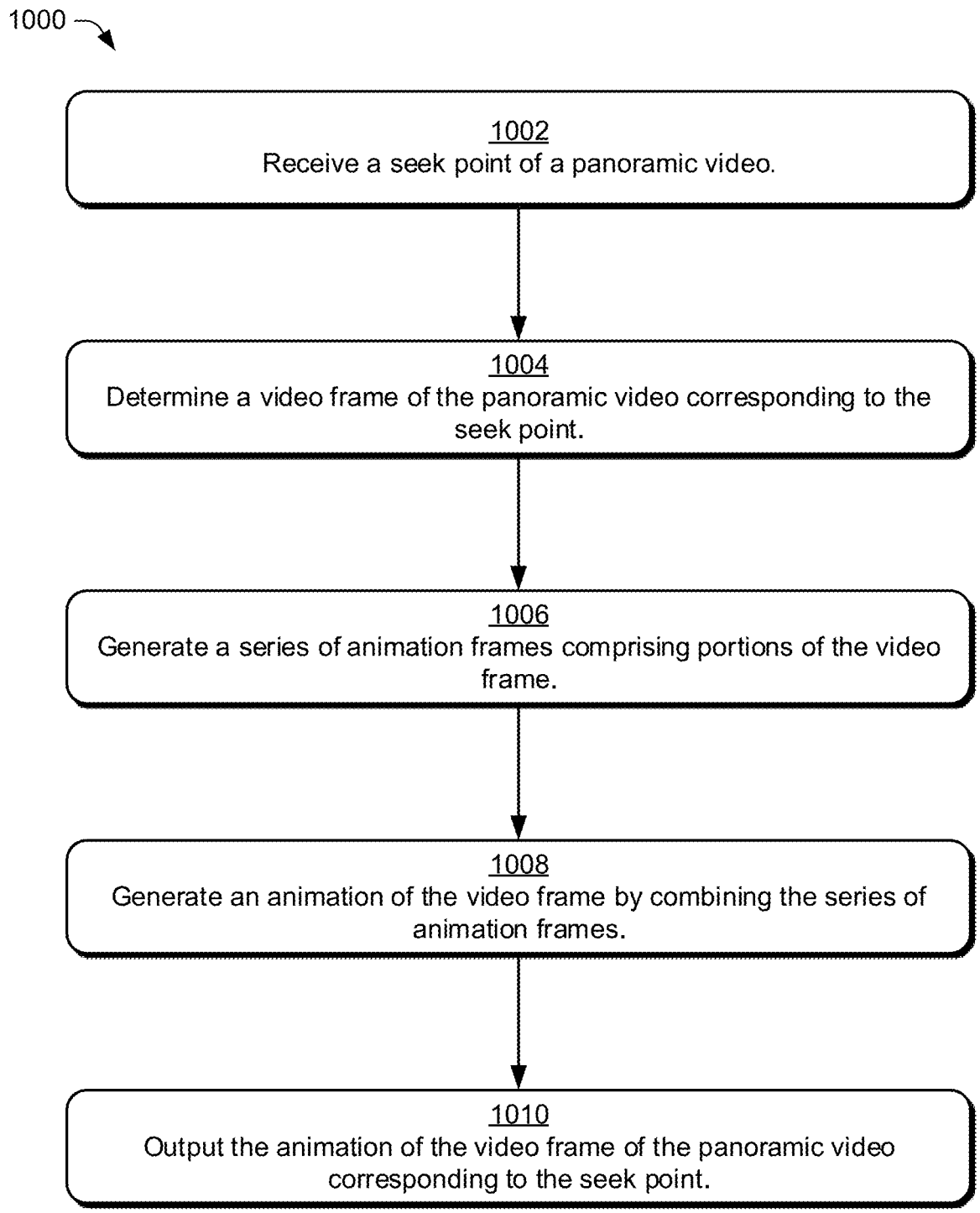
FIG. 10 is a flow diagram depicting a procedure in an example implementation to generate an animation of a frame of a panoramic video corresponding to a seek point when the frame is an equirectangular projection (or similar).

FIG. 10 depicts, generally at 1000, a procedure in an example implementation in which an animated seek preview is generated by a computing device corresponding to a video frame of a panoramic video that is an equirectangular projection or other projection that does not distort portions around an equatorial axis.

First, a seek point of the panoramic video is received by the computing device (step 1002). The seek point may be received by the computing device as a specified time in the panoramic video, a cursor location on a progress bar, a gesture, voice command, keyboard input, and so on. An example of a seek point is discussed with respect to FIG. 3.

Second, a video frame corresponding to the received seek point is determined by the computing device (step 1004). Since the panoramic video contains a series of video frames corresponding to points in time, there exists a single video frame that corresponds to the seek point. In this case, the video frame is received by the computing device as an equirectangular projection however any projection that does not distort portions of the video frame around the equatorial axis may be used by the computing device. An example of a received video frame is discussed with respect to FIGS. 6-9.

Third, a series of animation frames are generated by the computing device containing portions of the received video frame. Because the video frame is received by the computing device as an equirectangular projection (or similar), portions of the video frame around the equator are not distorted. This enables the computing device to merely parse the video frame into a number of manageable viewports centered on the equator and generate animation frames based on the viewports. As discussed above, the computing device may utilize a sliding window to traverse the equator of the video frame to produce the animation frames. Examples of generated animation frames are discussed with respect to animation frames 902-916 of FIG. 9 which may be generated directly from equirectangular projection 602.

Fourth, the animation frames are combined by the computing device to create an animation of the video frame (step 1008) and the animation is output by the computing device for consumption (step 1010). For example, the animation may comprise an animated gif of portions of the video frame corresponding to the seek point that span an equatorial axis, i.e. revolve around a central axis. Again, examples of generated animation frames are discussed with respect to animation frames 902-916 of FIG. 9.

Although described in terms of the above steps, in an implementation, the computing device may convert a received video frame to an equirectangular projection (or similar) prior to generating the series of animation frames. In this way, a panoramic video can be stored using frames that do contain distortions around the equatorial axis.

Further, some implementations may determine a popular frame from the series of frames and display the animation of the video frame starting from the popular frame or immediately prior (e.g., 1 or 2 frames prior) to the popular frame. The popularity of the frame may be determined based on the number of views, the number of "likes" in the past by other users, or a user-specification of its popularity. In some implementations, additional thumbnails may also be displayed alongside the animation where the additional thumbnails show one or more popular field-of-views.

Figure 11:
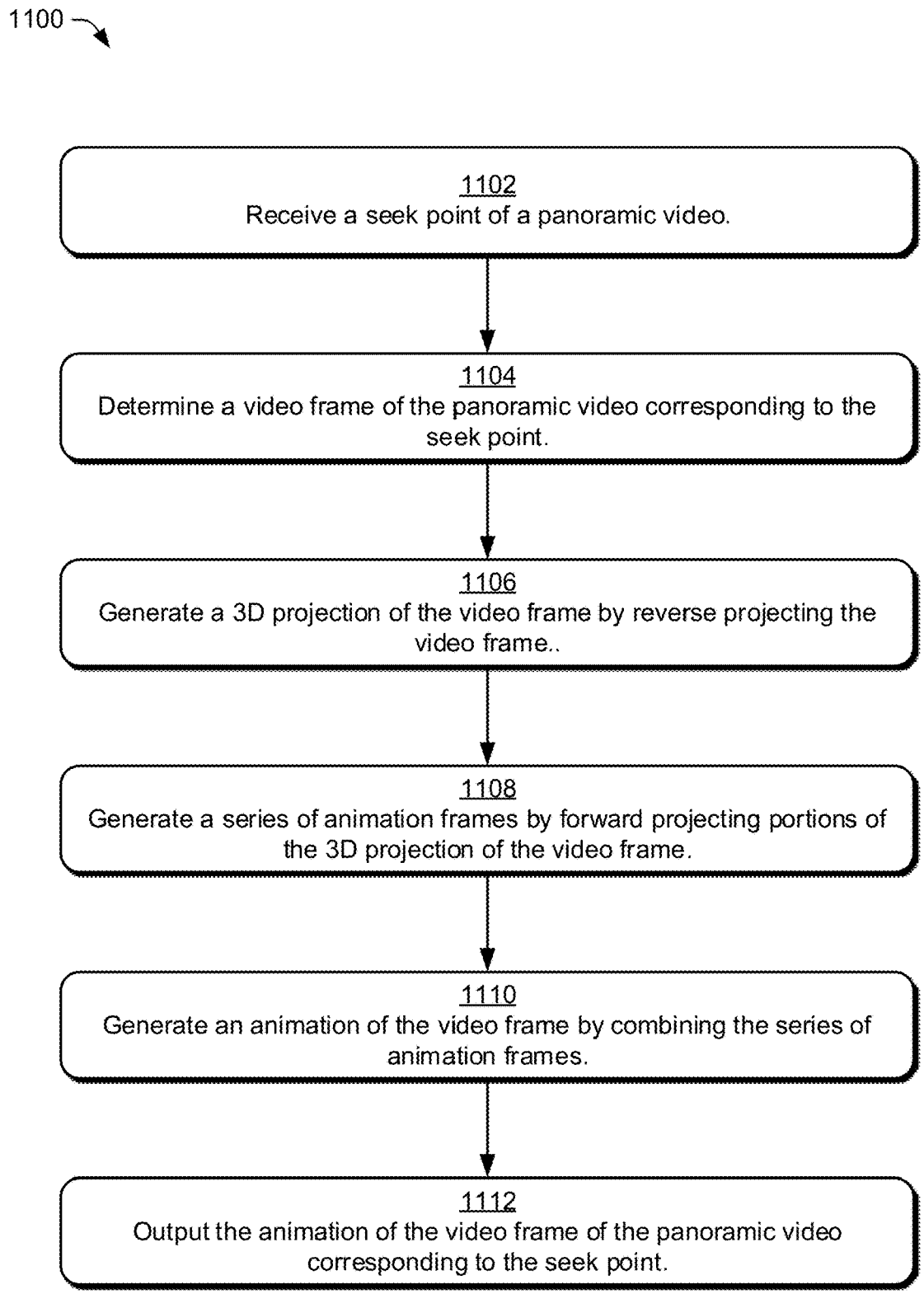
FIG. 11 is a flow diagram depicting a procedure in an example implementation to generate an animation of a frame of a panoramic video corresponding to a seek point when the frame is a generic format.

FIG. 11 depicts, generally at 1100, a procedure in an example implementation in which an animated seek preview is generated by a computing device corresponding to a generic video frame of a panoramic video. Procedure 1100 is used when animation frames cannot be taken directly from the video frame by the computing device due to distortions around an equatorial axis of the video frame.

First, a seek point of the panoramic video is received by the computing device (step 1102). The seek point may be received by the computing device as a specified time in the panoramic video, a cursor location on a progress bar, a gesture, voice command, keyboard input, and so on. An example of a seek point is discussed with respect to FIG. 3.

Second, a video frame corresponding to the received seek point is determined by the computing device (step 1104). Since the panoramic video contains a series of video frames corresponding to points in time, there exists a single video frame that corresponds to the seek point. In this case, the video frame is received by the computing device as an equirectangular projection. An example of a received video frame is discussed with respect to FIGS. 6-9.

Third, a 3D projection of the video frame is generated by the computing device by reverse projecting the video frame (step 1106). The video frame is received by the computing device as a 2D projection, thus, there is an algorithm (depending on the type of projection) that will project the video frame to the 3D projection. An example of a reverse projected video frame is discussed with respect to FIGS. 7 and 8.

Fourth, a series of animation frames are generated by the computing device by forward projecting portions of the 3D projection of the video frame (1108). As discussed above, the computing device may utilize a sliding window to traverse the equator of the 3D projection to produce the animation frames. Examples of generated animation frames are discussed with respect to FIG. 8 and animation frames 902-916 of FIG. 9.

Fifth, an animation of the video frame corresponding to the seek point is generated by the computing device by combining the series of animation frames (step 1110) and the animation is output by the computing device for consumption (step 1112). Generally, the animation frames are combined by the computing device such that adjacent portions in the projections are adjacent in the animation. For example, the animation may comprise an animated gif of portions of the video frame that span an equatorial axis, i.e. revolve around a central axis. Again, examples of generated animation frames are discussed with respect to animation frames 902-916 of FIG. 9.

Example System and Device

Figure 12:
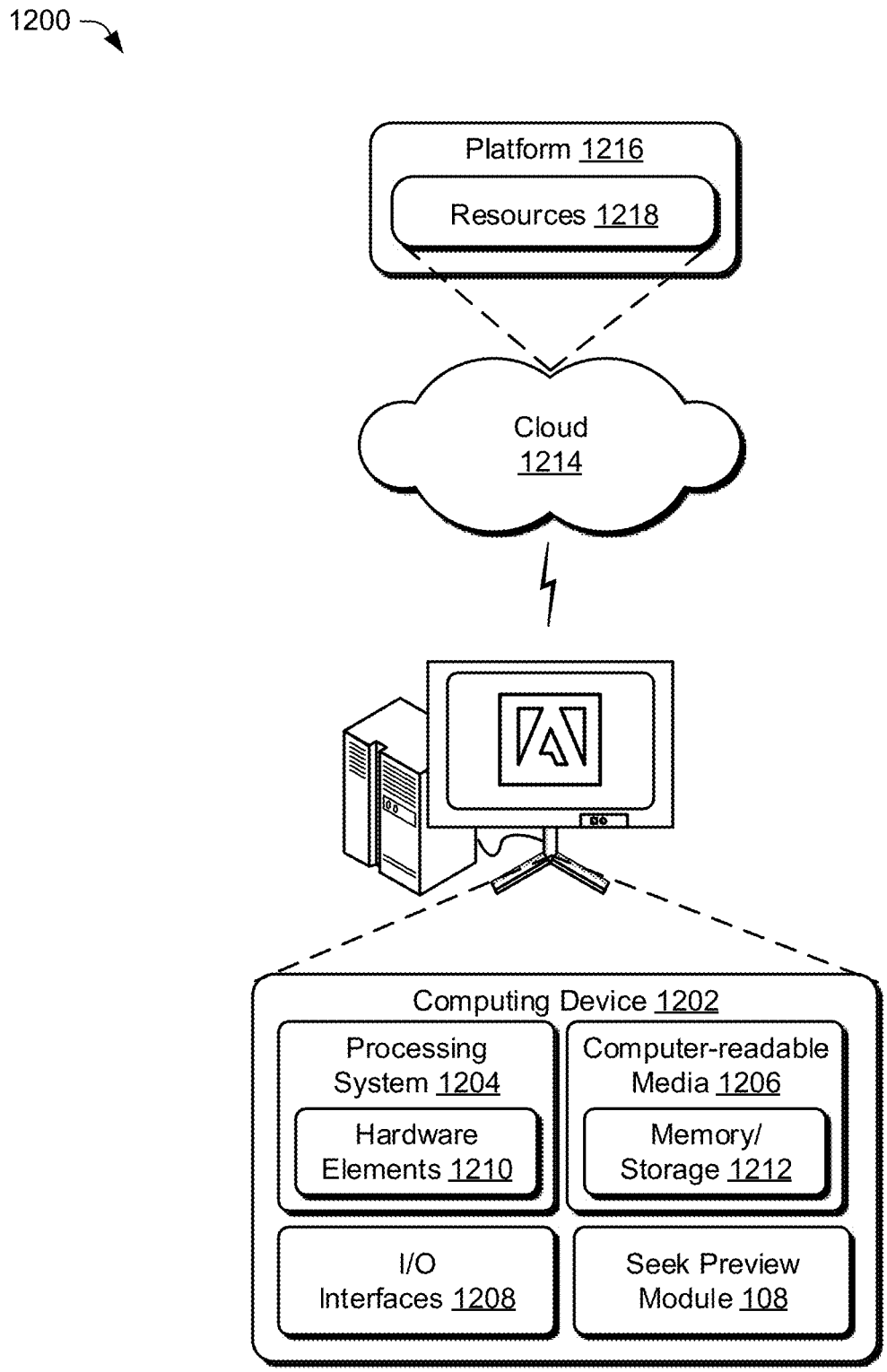
FIG. 12 is an illustration of a system and device in an example implementation that is operable to generate thumbnails from panoramic images.

FIG. 12 depicts, generally at 1200, an example implementation showing an example computing device 1202 that is representative of one or more computing systems and/or devices that may implement the various techniques described herein. This is illustrated through inclusion of the seek preview module 108, which may be configured to generate animated seek previews for panoramic images. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which the elements are formed or the processing mechanisms employed therein. For example, processors may be configured as of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device implementation, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium panoramic video output preview environment, a method implemented by at least one computing device, the method comprising:
   receiving, by the at least one computing device, a user input defining a seek point that specifies a point-in-time in relation to an output of a panoramic video;
   determining, by the at least one computing device, a video frame of a plurality of video frames of the panoramic video that corresponds to the point-in-time of the seek point;
   generating, by the at least one computing device, a series of frames from respective portions of having different fields of view of the determined video frame;
   generating, by the at least one computing device, an animation based on the series of frames; and
   outputting, by the at least one computing device, the series of frames of the animation, one after another, as corresponding to the seek point.

2. The method of claim 1, wherein the portions are associated with different fields of view of the video frame.

3. The method of claim 1, wherein the portions, in conjunction, span an equator of the video frame.

4. The method of claim 3, wherein the frames are generated by sliding a window along the equator of the video frame.

5. The method of claim 1, wherein the video frame is an equirectangular projection.

6. The method of claim 1, wherein the video frame is a two-dimensional projection and further comprising reverse projecting, by the at least one computing device, the video frame to a three-dimensional projection of the video frame, prior to generating the animation.

7. The method of claim 6, wherein:
   the portions of the video frame comprise portions of the three-dimensional projection of the video frame; and
   the frames comprise two-dimensional projections of the respective portions of the three-dimensional projection of the video frame.

8. The method of claim 1, further comprising:
   receiving, by the at least one computing device, the seek point during a display of a portion of at least one other video frame of the panoramic video; and generating, by the at least one computing device, a first said frame from a portion of the video frame that corresponds to the portion of the at least one other video frame.

9. The method of claim 1, wherein a first said frame is generated from a portion of the video frame centered in the video frame.

10. The method of claim 1, wherein the portions of the video frame comprise fields of view of a human eye.

11. The method of claim 1, wherein the portions of the video frame overlap.

12. In a digital medium panoramic video output preview environment, a system comprising:
  a seek preview module implemented at least partially in hardware of a computing device to:
    receive a seek point of the panoramic video corresponding to a time point in relation to an output of a panoramic video;
    determine a video frame of a plurality of video frames of the panoramic video that corresponds to the time point of the seek point;
    generate a series of frames associated with respective viewports of the video frame, the viewports corresponding to different portions of the video frame;
    generate an animation of the video frame by combining the series of frames; and
    output the series of frames of the animation of the video frame as corresponding to the time point of the seek point.

13. The system of claim 12, wherein the seek preview module includes a reverse projection module implemented at least partially in hardware of the computing device to reverse project the video frame to a three-dimensional projection of the video frame.

14. The system of claim 13, wherein the seek preview module includes a sliding window forward projection module implemented at least partially in hardware of the computing device to forward project portions of the three-dimensional projection of the video frame to two-dimensional projections to generate the respective frames.

15. The system of claim 12, wherein the viewports are centered on an equatorial axis of the video frame and at least partially overlap, one to another.

16. The system of claim 12, wherein the video frame comprises a 360-degree field of view and the viewports span the entire 360-degree field of view.

17. In a digital medium panoramic video output preview environment, a system comprising:
  means for displaying a panoramic video in a user interface;
  means for receiving a seek point corresponding to a point in time in an output of the panoramic video;
  means for determining a video frame of a plurality of video frames of the panoramic video as corresponding to the point in time of the seek point;
  means for generating a plurality of frames from portions of the video frame;
  means for generating the animation of the video frame by combining the frames; and
  means for outputting the combined frames of the animation of the video frame of the panoramic video in succession as corresponding to the point in time of the seek point in the user interface.

18. The system of claim 17, wherein the means for generating the plurality of frames comprises:
  means for reverse projecting the video frame to a three-dimensional projection of the video frame; and
  means for forward projecting the portions of the video frame from the three-dimensional projection of the video frame to two-dimensional projections of the portions of the video frame in order to generate the respective frames.

19. The system of claim 18, wherein the video frame is a two-dimensional projection that contains distortion along an equatorial axis.

20. The system of claim 17, wherein the frames comprise direct representations of overlapping portions of the video frame that traverse an equatorial axis of the video frame.

* * * * *